(12) United States Patent
Taya et al.

(10) Patent No.: US 7,387,747 B2
(45) Date of Patent: Jun. 17, 2008

(54) METHOD OF MAKING THERMAL INTERFACE MATERIAL (TIM) WITH CARBON NANOTUBES (CNT)

(75) Inventors: Minoru Taya, Mercer Island, WA (US); Jong-Jin Park, Mountlake Terrace, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 11/655,362

(22) Filed: Jan. 19, 2007

(65) Prior Publication Data

US 2007/0147472 A1 Jun. 28, 2007

Related U.S. Application Data

(63) Continuation of application No. 11/011,544, filed on Dec. 13, 2004, now Pat. No. 7,186,020.

(60) Provisional application No. 60/528,979, filed on Dec. 12, 2003.

(51) Int. Cl.
*C05K 5/08* (2006.01)

(52) U.S. Cl. .................... 252/71; 977/778; 977/785; 977/786; 977/787

(58) Field of Classification Search ................ 252/71; 977/778, 785, 786, 787
See application file for complete search history.

(56) References Cited

U.S. PATENT DOCUMENTS 6,764,759 B2   7/2004   Duvall et al.
6,891,724 B2   5/2005   De Lorenzo et al.

*Primary Examiner*—Evan Pert
(74) *Attorney, Agent, or Firm*—Blakely Sokoloff Taylor & Zafman LLP

(57) ABSTRACT

According to embodiments of the present invention, a very thin thermal interface material (TIM) is developed, which is composed of carbon nanotubes, silicon thermal grease, and chloroform. The carbon nanotubes and chloroform comprise the filler and the silicone thermal grease comprises the matrix.

4 Claims, 9 Drawing Sheets

300

400

700

METHOD OF MAKING THERMAL INTERFACE MATERIAL (TIM) WITH CARBON NANOTUBES (CNT)

CROSS REFERENCE TO RELATED APPLICATIONS

This application is a Continuation of U.S. application Ser. No. 11/011,544, filed Dec. 13, 2004 now U.S. Pat. No. 7,186,020, which claims the benefit of U.S. Provisional Application No. 60/528,979, filed Dec. 12, 2003.

BACKGROUND

1. Field

Embodiments of the present invention relate to packaging of electronic components and, in particular, to thermal interface material (TIM) for use with electronic components.

2. Discussion of Related Art

Thermal management is a key task for an electronic packaging engineer working on high power integrated circuits such as microprocessors and pumped laser diodes, for example. There are two technical issues associated with the above thermal management. One issue is how to design a thermal interface material (TIM) that transports high heat flux emitting from the microprocessor or pumped laser diode chip effectively and promptly. The second issue is how to ensure measurements of thermal properties of a thermal interface material are accurate.

A goal of development of new thermal interface materials is to reduce thermal resistance (R) or equivalently the thermal impedance ($\theta$). Thermal resistance (R) and thermal impedance ($\theta$) are defined by:

$$R = \rho \frac{t}{A} \quad (1)$$

$$\theta = RA = \rho t \quad (2)$$

where, $\rho$ is the thermal resistivity, equal to 1/k (k is thermal conductivity), A is the area and t is the thickness of thermal interface material.

There are two approaches to reducing thermal impedance ($\theta$). One is to reduce thermal resistivity ($\rho$). The other is to reduce the thickness (t) of thermal interface material. There are several thermal interface materials that meet this challenge, but many still have limitations.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
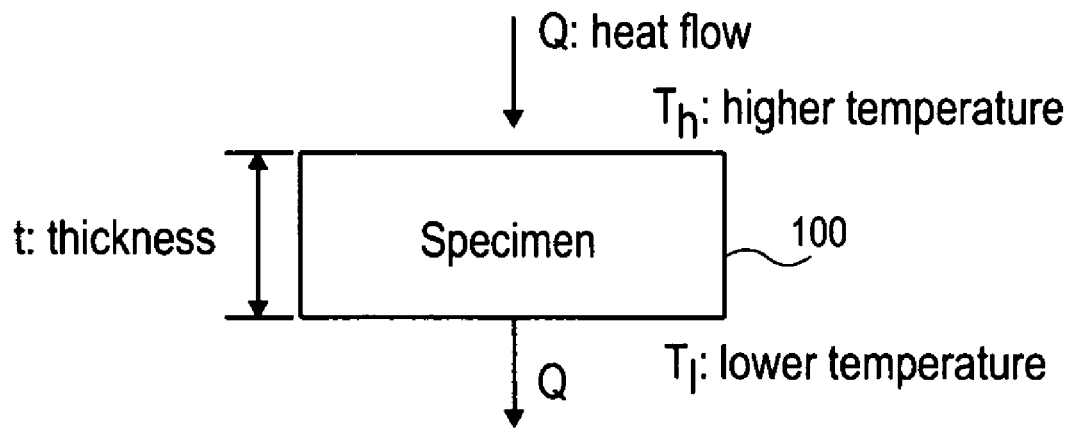
FIG. 1 is a schematic diagram illustrating one dimensional heat conduction of a thermal interface material under steady state conditions according to an embodiment of the present invention.

FIG. 1 is a schematic diagram illustrating a thermal interface material 100 (specimen) according to an embodiment of the present invention. The thermal interface material 100 includes a thickness (t), a high temperature ($T_h$), a low temperature ($T_l$), and a heat flow (Q).

One-dimensional heat conduction under steady-state condition is given by:

$$\frac{Q}{A} = K \frac{\Delta T}{\Delta x} \quad (1)$$

where Q is the heat flow in watts, A, $\Delta x$ and K are surface area, thickness and thermal conductivity of the thermal interface material 100, respectively, and $\Delta T$ is temperature difference between high temperature ($T_h$) and low temperature ($T_l$).

Thermal resistance R (K/W) is defined from equation (1).

$$R = \frac{\Delta T}{Q} = \frac{T_h - T_l}{Q} = \frac{t}{KA} \quad (2)$$

Sometimes, thermal impedance θ (Kcm²/W) is a convenient property that is defined as:

$$\theta = RA = \frac{t}{K} \quad (3)$$

Figure 2:
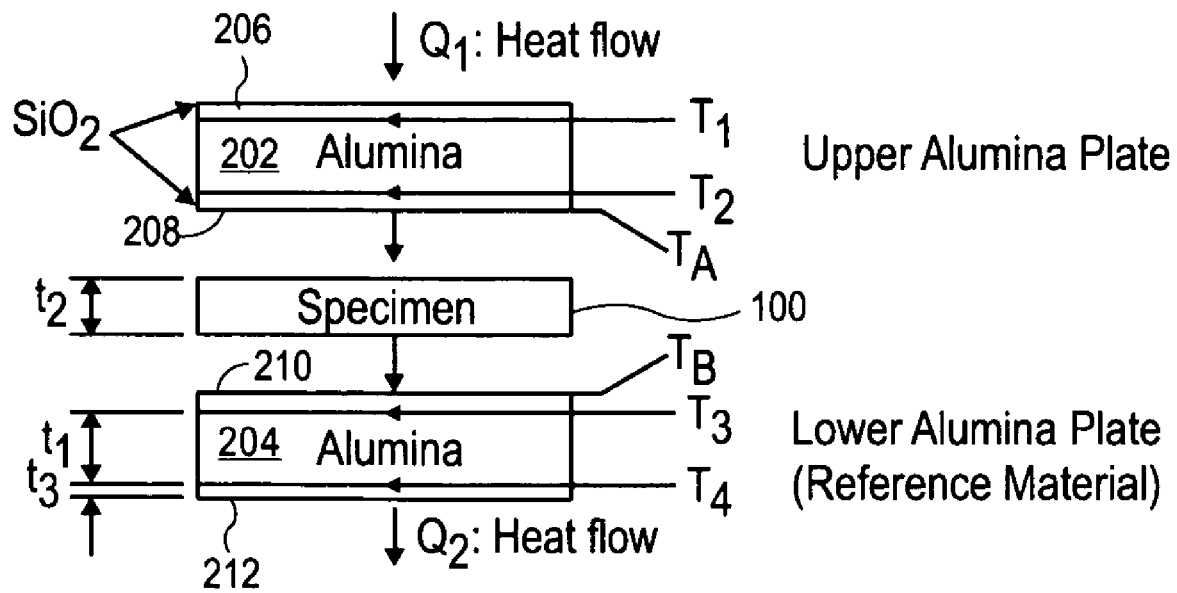
FIG. 2 is a schematic diagram illustrating heat conduction of a thermal interface material disposed between two alumina plates according to an embodiment of the present invention.

FIG. 2 is a schematic diagram illustrating an apparatus 200 fabricated according to embodiments of the present invention. In the illustrated embodiment, the thermal interface material 100 is disposed between two alumina substrates 202 and 204. A layer 206 of silicon dioxide ($SiO_2$) is disposed on the top surface of the alumina substrate 202. A layer 208 of silicon dioxide ($SiO_2$) is disposed on the bottom surface of the alumina substrate 202. The alumina substrate 204 also may have a layer 210 and a layer 212 of silicon dioxide ($SiO_2$) disposed on its top and bottom surfaces, respectively.

$T_A$ is the temperature on the bottom surface of the upper alumina plate 202 and $T_B$ is the temperature on the top surface of the lower alumina plate 204.

In the illustrated embodiment, $t_1$, $t_2$, and $t_3$ are thickness of alumina, specimen, and $SiO_2$ layer, respectively. For the upper alumina plate, $Q_{Alumina}$ and $Q_{SiO2}$ are calculated as:

$$Q_{Alumina} = \frac{(T_1 - T_2) \times A}{\theta_{Alumina}} \quad (4)$$

$$Q_{SiO_2} = \frac{(T_2 - T_A) \times A}{\theta_{SiO_2}} \quad (5)$$

$$Q_{Alumina} = \frac{(T_3 - T_4) \times A}{\theta_{Alumina}} \quad (6)$$

With equations (4), (5), and (6), and assuming $Q_{Alumina} = Q_{SiO2}$, $T_A$ and $T_B$ are expressed as:

$$T_A = T_2 - \frac{\theta_{SiO_2}}{\theta_{Alumina}}(T_1 - T_2) \quad (7)$$

$$T_B = T_3 + \frac{\theta_{SiO_2}}{\theta_{Alumina}}(T_3 - T_4) \quad (8)$$

From equation (3), thermal impedance θ is defined as thickness divided by thermal conductivity K. Thermal conductivities of alumina and $SiO_2$ have been reported as 25 W/mK and 1.5 W/mK, respectively, in Hannemann, R., Kraus, A., and Pecht, M., Physical Architecture of VLSI Systems. New York, John Wiley & Sons, Inc., 1994, and thickness t of alumina and $SiO_2$ are measured as 1.2 mm and 5 μm, respectively. Therefore, the thermal impedance θ of alumina and $SiO_2$ are calculated as 0.48 Kcm²/W and 0.03 Kcm²/W, respectively. Based on equations (7) and (8), and measured temperatures, $T_1$~$T_4$, one can calculate $T_A$ and $T_B$, which are set equal to $T_h$ and $T_l$, respectively. Therefore, thermal resistance R and thermal impedance θ of the thermal interface material 100 may be calculated by equations. (2) and (3), respectively.

Thermal interface material usually includes thermally conductive fillers and a matrix. Fillers transfer heat rapidly while the matrix helps the installation of a thermal interface material between a chip and a heat spreader or heat sink.

A goal of development of new thermal interface materials is to reduce thermal resistance R defined by equation (2) or equivalently thermal impedance θ defined by equation (3). Since the surface area of a chip is pre-determined, there exist only two parameters that can be modified to achieve lower value of thermal resistance R and thermal impedance θ, i.e., a reduction of thickness (t) and an increase in thermal conductivity (K) of a thermal interface material.

Thermal conductivity K can be increased by increasing the volume fraction of the conductive fillers, but this would make the viscosity of the thermal interface material higher, more difficult for a packaging engineer to install the thermal interface material. In addition to the volume fraction, filler size, shapes, thermal conductivity of fillers and matrix, applied pressure during the installation, manufacturing procedures are expected to influence on the thermal resistance R and thermal impedance θ of a thermal interface material.

Figure 3:
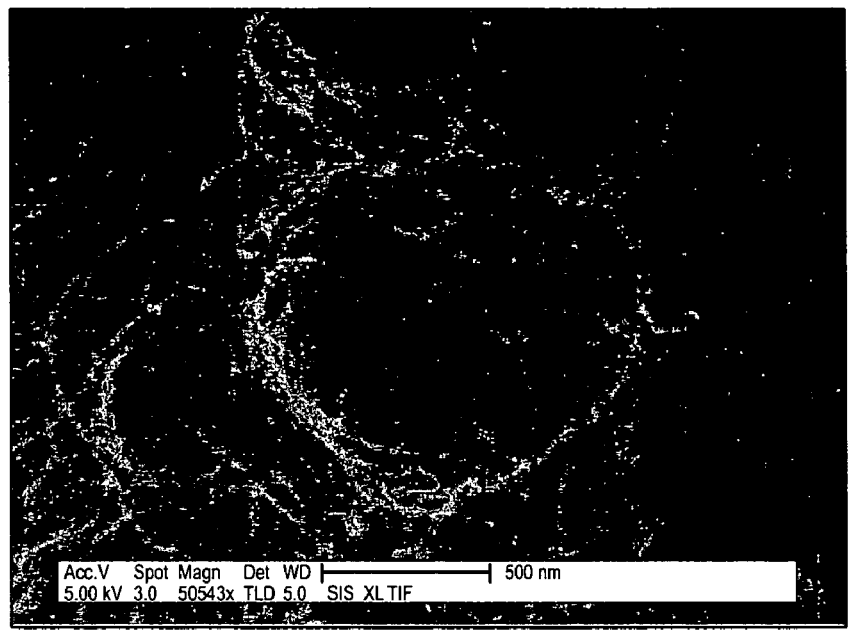
FIG. 3 is a scanning electron microscopy (SEM) photograph of commercially available carbon nanotubes.

According to embodiments of the present invention, carbon nanotubes and silicone thermal grease are chosen as filler and matrix, respectively. Suitable carbon nanotubes may be obtained from CNI Company, Houston, Tex., and may be single walled carbon nanotubes. FIG. 3 is a scanning electron microscopy (SEM) photograph of commercially available carbon nanotubes 300. Suitable silicone thermal grease may be obtained from Epoxies Company, Cranston, R.I.

In one embodiment, chloroform may be used as a solvent for the silicone thermal grease. This because silicone thermal grease can be solvable into chloroform and chloroform is environmentally benign.

Table 1 lists the weights for filler, matrix, and solvent for two compositions of thermal interface materials according to embodiments of the present invention.

TABLE 1

|  | Filler (carbon nanotube) | Matrix (Silicone thermal grease) | Solvent (chloroform) |
| --- | --- | --- | --- |
| Composition 1 | 0.0508 g (0.0382 cm²) | 0.1062 g (0.0462 cm²) | 0.2231 g (0.1507 cm²) |
| Composition 2 | 0.0232 g (0.0174 cm²) | 0.0958 g (0.0417 cm²) | 0.2012 g (0.1359 cm²) |

For composition 1, commercially available carbon nanotubes and commercially available silicone thermal grease are weighed to be 0.0508 g, and 0.1062 g, respectively. Carbon nanotubes, silicone thermal grease, and chloroform may be inserted into a beaker together at room temperature and ultrasonic power may be applied to cause the carbon nanotubes to spread substantially uniformly.

Figure 4:
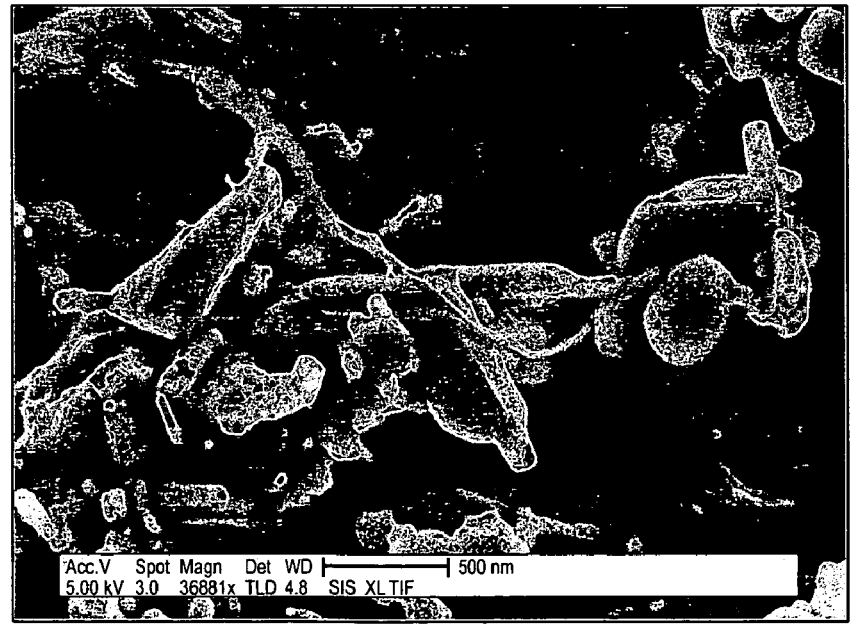
FIG. 4 is a scanning electron microscopy (SEM) photograph of carbon nanotubes disposed in a matrix according to an embodiment of the present invention.

After mixing, the chloroform is evaporated so that small amount of chloroform remains in the thermal interface material with weight of 0.223 g for composition 1. FIG. 4 is a scanning electron microscopy (SEM) photograph of a microstructure of a thermal interface material 400 having carbon nanotubes disposed in a matrix according to an embodiment of the present invention. As can be seen, the carbon nanotubes are coated with silicone thermal grease.

Specific gravities of carbon nanotubes, silicone thermal grease, and chloroform are 1.33, 2.30, and 1.48, respectively. So, the volume fraction of filler is 16.2%, that of matrix is 19.6% and the balance is that of solvent.

In one embodiment, the apparatus 200 is used to accurately measure heat flow Q through the thermal interface material 100 as well as to measure temperatures at the upper part ($T_h$) and low part ($T_l$) of the thermal interface material 100 assuming the one-dimensional heat flow Q downward. In the embodiment illustrated in FIG. 2, the high temperature ($T_h$) and the low temperature ($T_l$) are interpreted as $T_A$ and $T_B$, respectively.

The apparatus 200, which includes the upper and lower alumina substrates 202 and 204, respectively, as well as a resistor circuit (shown in FIG. 5), functions as a thermometer, with arrangement having the lower alumina plate 204 being a reference material 210. In embodiments, when selecting a reference material, its thermal impedance is designed to have a value similar to that of the thermal interface material 100, which may be 0.05~0.3 Kcm$^2$/W. For alumina with thermal conductivity of 25 W/mK and thickness of 1.27 mm, the thermal impedance is 0.48 Kcm$^2$/W by equation (2). Therefore, in embodiments of the present invention, this dimension is chosen for the reference material.

Figure 5:
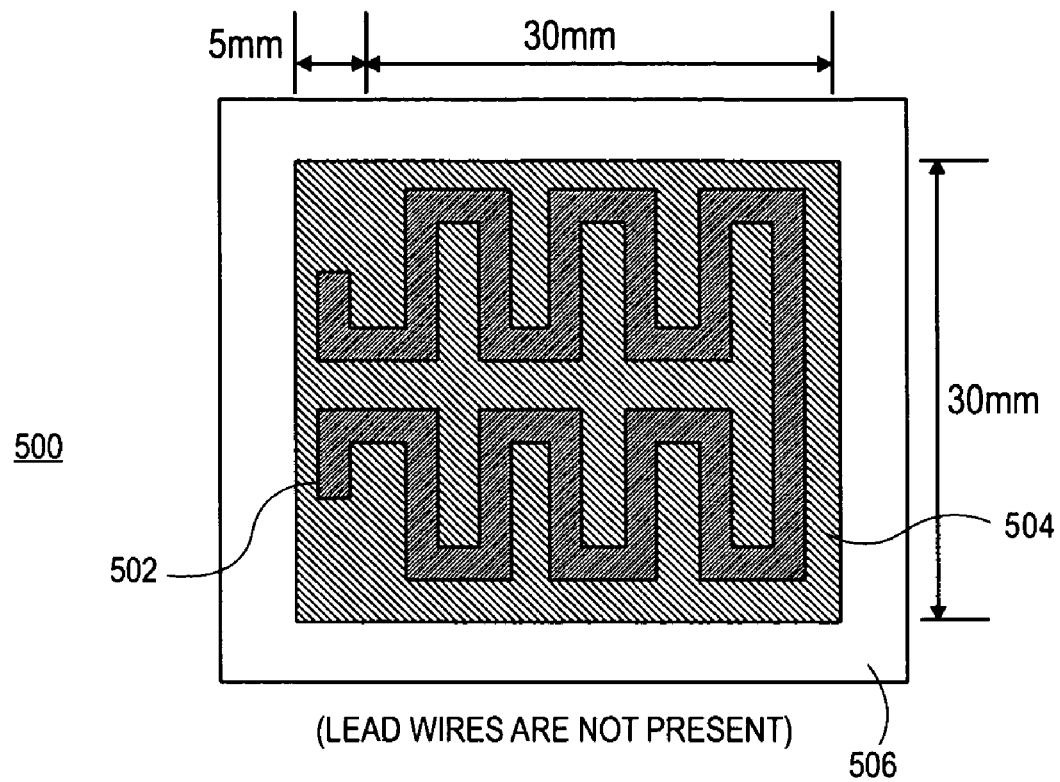
FIG. 5 is a photograph of one of the alumina plates depicted in FIG. 2 according to an embodiment of the present invention.

FIG. 5 is a top view of a thermometer 500. In the illustrated embodiment, the thermometer 500 is a 35 mm×30 mm rectangular shape and includes a metal resistor 502 having a pattern illustrated in FIG. 5. The metal resistor 502 is disposed on a layer 504 of silicon dioxide (SiO$_2$). The layer 504 is disposed on an alumina substrate 506.

Figure 6:
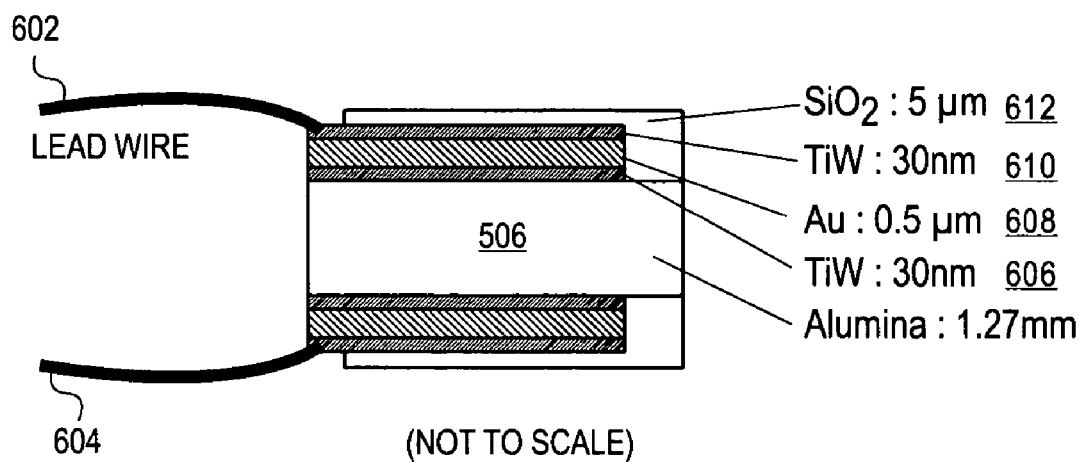
FIG. 6 is a cross-sectional view of a thermometer according to an embodiment of the present invention.

FIG. 6 is a cross-sectional view of the thermometer 500 according to an embodiment of the present invention. In the illustrated embodiment, the thermometer 500 area of 6 mm×30 mm includes the area for lead wires 602 and 604.

In order to construct the thermometer 500, a layer 606 of titanium-tungsten (TiW) is deposited on the alumina substrate 202 by sputtering, for example. The layer 606 may have a thickness of 30 nm. A 0.5 μm thick layer 608 of Au may be deposited on the layer 606 of TiW. Another layer 610 of TiW layer may be deposited on the layer 608 of Au for better adhesion between Au layer 608 and alumina substrate 506. A layer 612 of silicon dioxide (SiO$_2$) is then deposited on the TiW layer 610 and the alumina substrate 506.

The layer 610 may have a thickness of 30 nm. The layer 612 of silicon dioxide (SiO$_2$) may have a thickness of 5 μm.

The layer 612 of SiO$_2$ may act as an electrical insulator preventing the direct contact between the metal layers 606, 608, and 610 and the thermal interface material 100. The TiW layer 606 may prevent gold (Au) particles from penetrating to the alumina substrate 506 and may enhance the bonding forces between the Au and the alumina substrate 506. The metal layers 606, 608, and 610 form the metal resistor layer 502. The temperature in the metal resistor 502 layer, which is measured from the change in the electrical resistance of the metal resistor 502, is used as the temperature of the thermometer 500.

In order to construct the apparatus 200 according to embodiments of the present invention, either composition 1 or composition 2 may be spread over the 30 mm×30 mm area of the thermometer 500. The chloroform may then be evaporated further.

In one embodiment, two resistance thermometers 500 and a standard thermocouple are placed into a furnace. The furnace has a known temperature. The two resistance thermometers 500 and the thermocouple are used as a reference. The electrical resistance of the thermometers is measured as a function of the furnace temperature.

Figure 7:
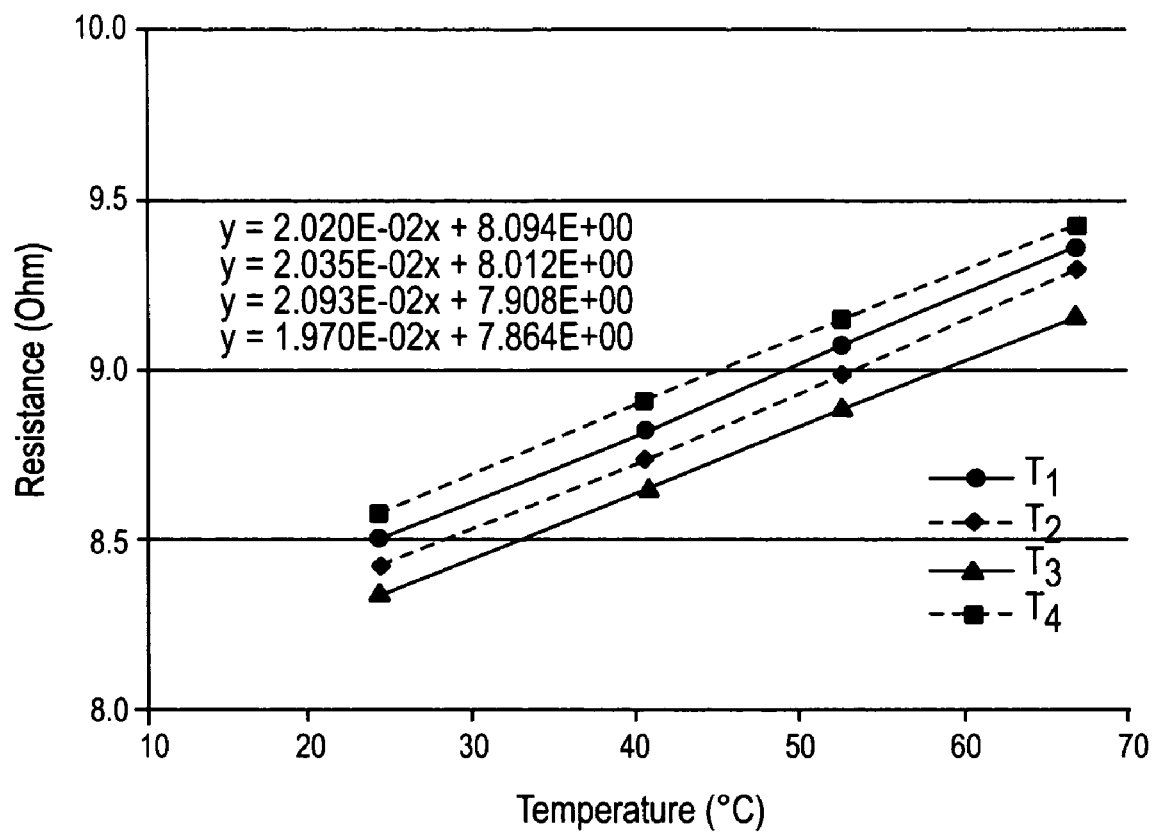
FIG. 7 is a graphical representation illustrating electrical resistance versus temperature of the thermometer depicted in FIG. 4 according to an embodiment of the present invention.

FIG. 7 is a graphical representation 700 illustrating electrical resistance versus temperature of the thermometer 500 according to an embodiment of the present invention. In the illustrated embodiment, $T_1$ represents the top temperature of the upper alumina substrate 202, $T_2$ represents the bottom temperature of the upper alumina substrate 202, $T_3$ represents the top temperature of the lower alumina substrate 204, and $T_4$ represents the top temperature of the lower alumina substrate 204.

The graphical representation 700 shows that the measured electrical resistance is a linear function of temperature. The data represented in the graphical representation 700 may be used as a calibration data set by which the measured electric resistances are converted to temperatures.

Figure 8:
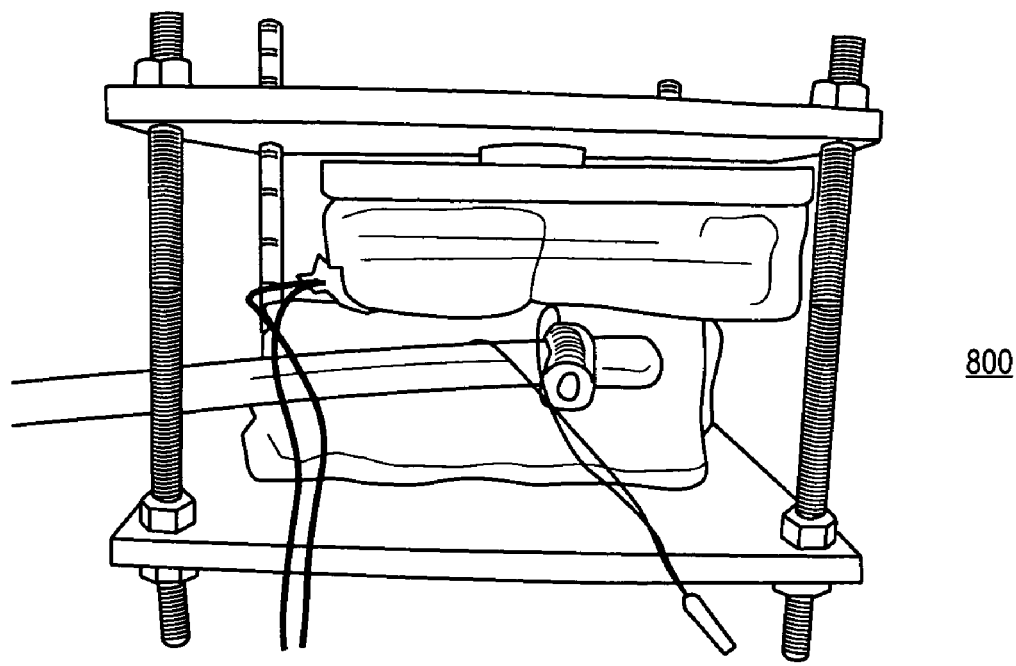
FIG. 8 is a photograph of thermal property measurement equipment according to an embodiment of the present invention.
Figure 9:
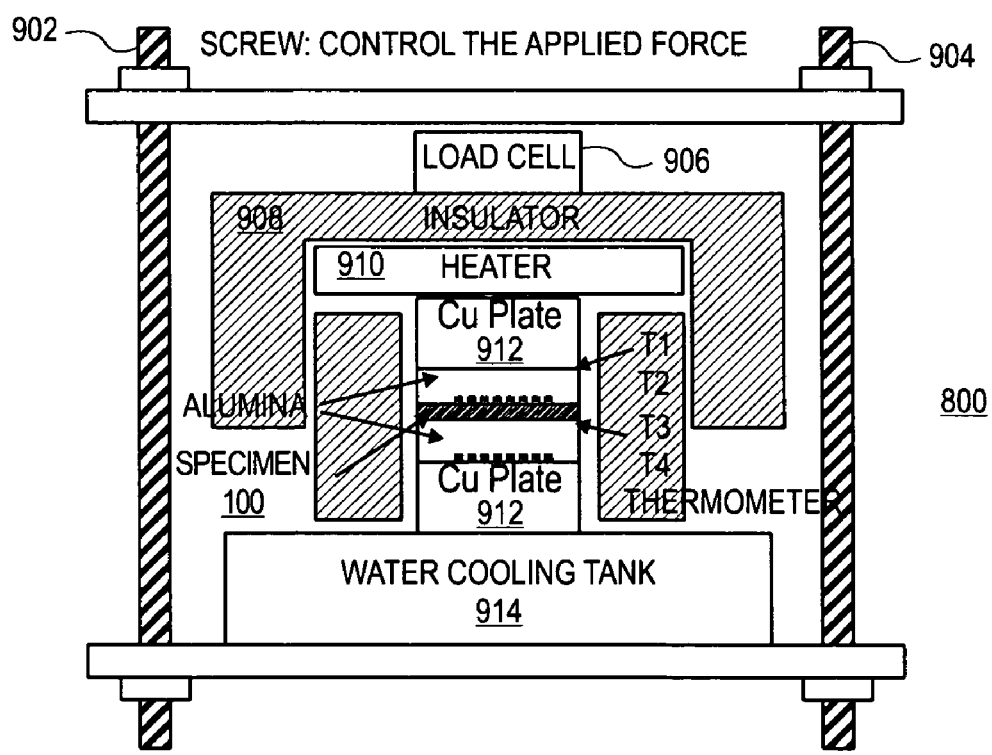
FIG. 9 is a schematic sketch of the thermal property measurement equipment depicted in FIG. 8 according to an embodiment of the present invention.

FIG. 8 is a photograph of an embodiment of thermal property measurement equipment 800 used to measure thermal properties of a thermal interface material composed according to embodiments of the present invention. FIG. 9 is a schematic sketch of the thermal property measurement equipment 800 according to an embodiment of the present invention. In the illustrated embodiments, the equipment 800 includes four screws, two screws 902 and 904 that are shown and two not shown, which control the applied force, a load cell 906, which measures the applied forces, an insulator 908, which prevents heat from passing through to the load cell 906, a heater 910, two copper plates 912, which distribute forces uniformly, two thermometers 500, the thermal interface material 400, and a water cooling tank 914, which is a heat sink. In order to fix the thickness of a thermal interface material 400, several spacers of known height may be used. FIG. 9 illustrates the measurement locations for $T_1$, $T_2$, $T_3$, and $T_4$.

Figure 10:
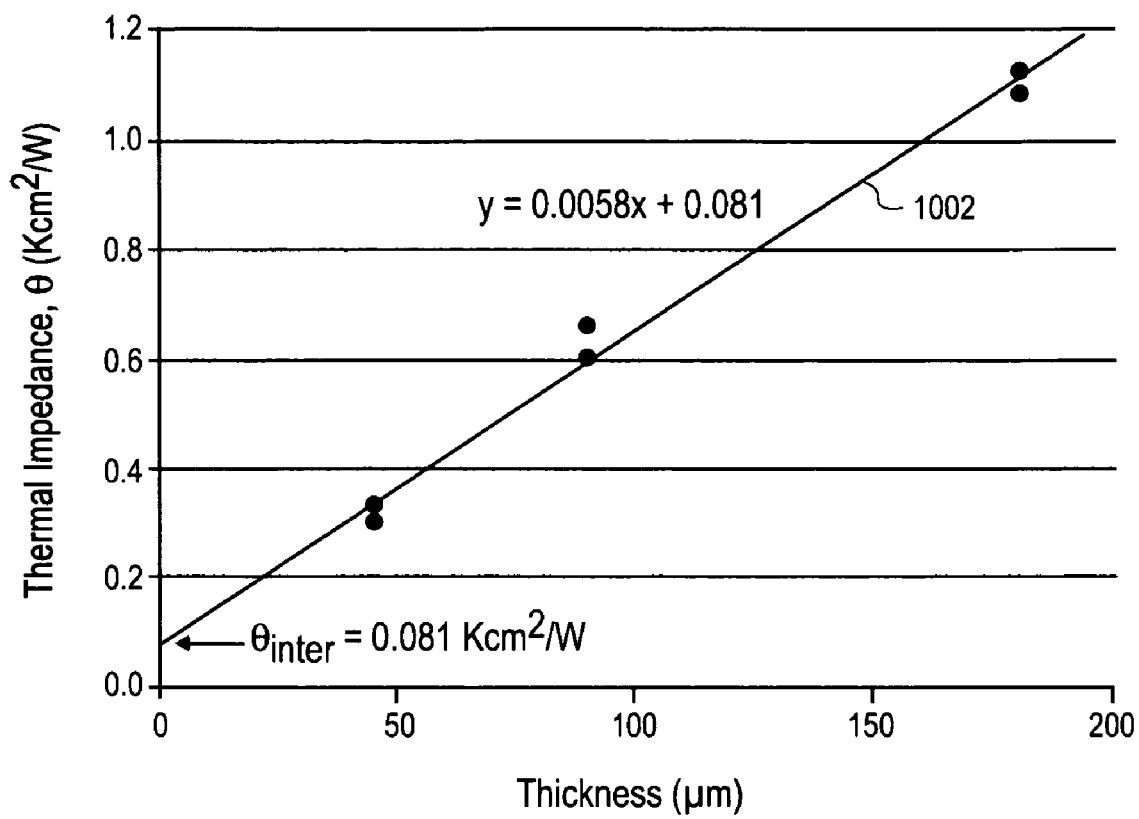
FIG. 10 is a graphical representation illustrating thermal interface impedance of a Honeywell® PCM-45 thermal pad versus the thickness according to an embodiment of the present invention.

First the thermal property of a commercial TIM made of PCM composite was measured FIG. 10 is a graphical representation 1000 illustrating thermal interface impedance of a Honeywell® PCM-45 thermal pad versus the spacer thickness which, may be equivalent to the thickness t of the thermal interface material 400 according to an embodiment of the present invention. These tests were performed under a constant pressure of 3.0±0.1 MPa at constant temperature of 50±2° C. The y-axis intercept is defined as thermal interface impedance ($\theta_{inter}$).

Note that the curve 1002 does not intersect the (0,0) coordinates of the graphical representation 1000. Ideally, the curve 1002 should intersect at (0,0), but due to the surface roughness of the Honeywell® PCM-45 thermal pad.

Table 2 lists the experimental results for thermal interface impedance of a Honeywell® PCM-45 thermal pad versus the thermal interface material 400 according to an embodiment of the present invention. As the table indicates, the average thermal impedance θ for the thermal interface material 400 is 0.0321 cm$^2$ k/W. Thus, the thermal interface material 400 may perform five times better than the Honeywell® PCM-45 thermal pad.

TABLE 2

|  | Thermal Impedance θ |
|---|---|
| Honeywell ® PCM-45 thermal pad | 0.18 cm$^2$k/W |
| Thermal Interface Material 400 | 0.040 cm$^2$k/W |
|  | 0.036 cm$^2$k/W |
|  | 0.026 cm$^2$k/W |
|  | 0.031 cm$^2$k/W |
|  | 0.027 cm$^2$k/W |

Figure 11:
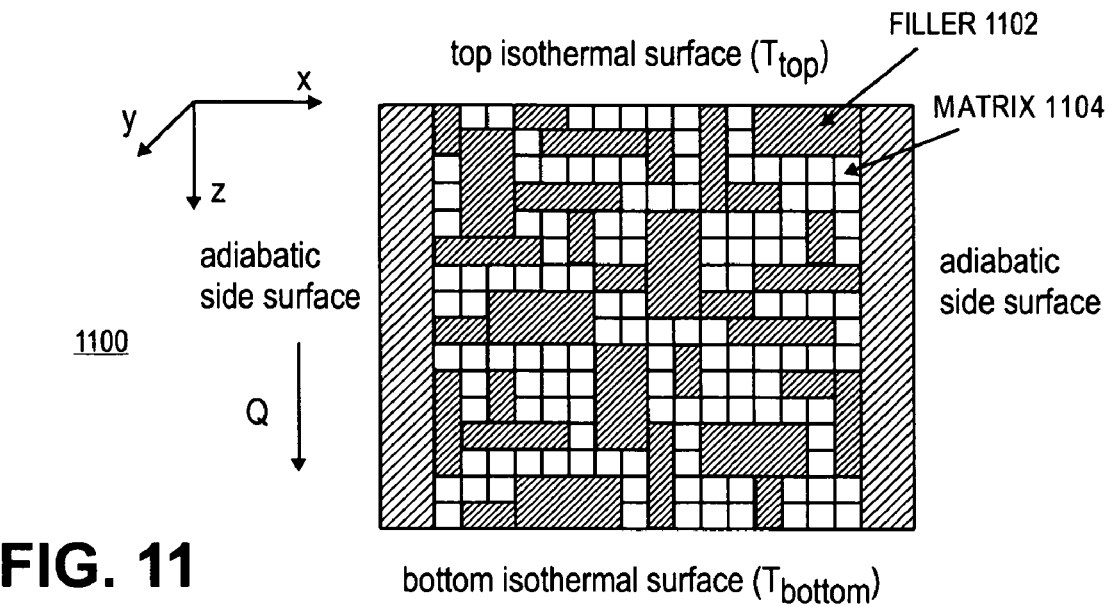
FIG. 11 is a thermal resistor network model of thermal interface material in a three dimensional cubic lattice system viewed by a two dimensional section according to an embodiment of the present invention.

FIG. 11 is a thermal resistor network model 1100 of thermal interface material 400 in a three dimensional cubic lattice system viewed by a two dimensional section according to an embodiment of the present invention. The network model 1100 may be simulated using computer dicing. As illustrated, thermal impedance of the PCM linearly increases with thickness t with y-axis incept of 0.081 Kcm²/W. This y-axis intercept is defined as thermal interface impedance ($\theta_{inter}$). The intrinsic thermal impedance of the thermal interface material 400, $\theta_{intrin}$, which is obtained by subtracting $\theta_{inter}$ from total thermal impedance $\theta_{total}$, is linearly proportional to the thickness t of the thermal interface material 400. The value of $\theta_{inter}$ is strongly influenced by the surface roughness of the thermal interface material 400, the upper an lower surfaces of the alumina substrate 202, and the upper and lower surfaces of the alumina substrate 204.

In one embodiment, the thermal impedance θ of the carbon-nanotubes-based thermal interface material 400 was measured under constant applied stress of 3.0±0.1 MPa and a constant temperature of 50±2° C. The dimension of the thermal interface material 400 is the same as before, i.e., 30 mm×30 mm.

When steady-state heat conduction reached, temperatures $T_1$, $T_2$, $T_3$, and $T_4$ are measured from the thermometer based on electrical resistances of the resistance thermometers 500. The temperatures at the top ($T_A$) and at the bottom ($T_B$) of the thermal interface material 400 may be calculated using equations (7) and (8). For the thermal interface material 400 of composition 1, five measurements were performed to obtain five thermal impedance values with the average value of 0.032 Kcm²/W. For the thermal interface material 400 of composition 2, similar testing was performed with the average of five thermal impedance values being 0.065 Kcm²/W.

In order to study the dependence of filler volume fraction on thermal interface material conductivity, in one embodiment, the thermal conductivity of a thermal interface with carbon-nanotube fillers was predicted. There exist a number of models based on effective medium theory to predict the thermal conductivity of a composite composed of conductive fillers and matrix. However, in these models, the shapes of the fillers are simple, short fillers, flakes and spherical particles and they are assumed to be of the same size whereas the microstructure of carbon-nanotube is far from the above simple geometry as evidenced by the carbon nanotubes 300. Therefore, in one embodiment, a three-dimensional (3D) resistor network model was employed.

The resistor network model 1100 is based on three-dimensional (3D) cuboidal shape, where a dark rectangular rod 1102 represents a conductor element (or carbon nanotube filler) and white rectangular rod 1104 represents matrix (or silicone thermal grease). The top and bottom surfaces of the 3D cuboidal thermal interface material 400 are assumed to be conductor and all four side surfaces are adiabatic wall, such as a reference electrode (anode and cathode) to ensure known boundary conditions. The change in temperature may be known, the thermal conductivity may be known, and the thermal resistance is to be calculated using these known values.

Figure 12:
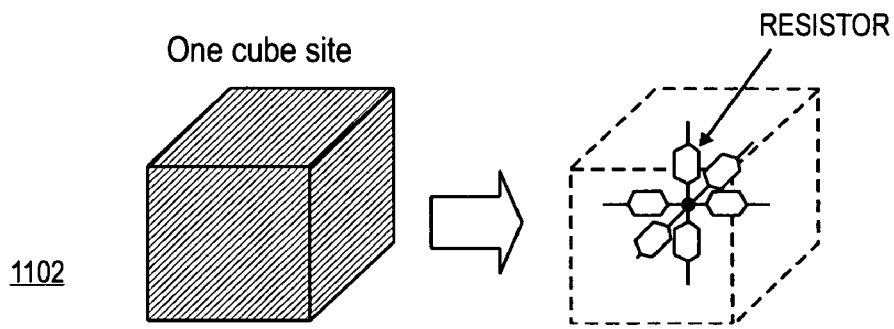
FIG. 12 is a model of resistors of a unit cube depicted in FIG. 11 according to an embodiment of the present invention.

In one embodiment a unit cube comprises six substantially identical resistors with half resistance of the site, as shown in FIG. 12. Thermal resistance of a resistor $R_i$ can be obtained from the known thermal conductivity $K_i$ of i-th unit cube and using equation (2) as:

$$R_i = \frac{\Delta x/2}{K_i \Delta x^2} = \frac{1}{2K_i \Delta x} \tag{9}$$

Figure 13:
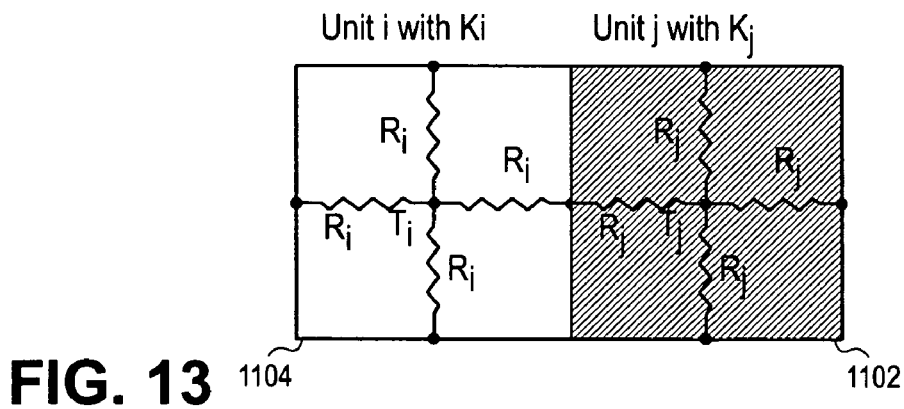
FIG. 13 is a model of thermal resistance of two resistors in the thermal resistor network depicted in FIG. 11 according to an embodiment of the present invention.

Thermal resistance $R_{ij}$ between sites i and j is given, as shown in FIG. 13.

$$R_{ij} = R_i + R_j = \frac{1}{2\Delta x} \frac{K_i + K_j}{K_i K_j} \tag{10}$$

To facilitate the computation procedure, thermal resistance is replaced by thermal conductance G using its reciprocal relation. Thermal conductance $G_{ij}$ between two sites (i and j) is defined by:

$$G_{ij} = \frac{1}{R_{ij}} = \frac{2\Delta x K_i K_j}{K_i + K_j} \tag{11}$$

Figure 14:
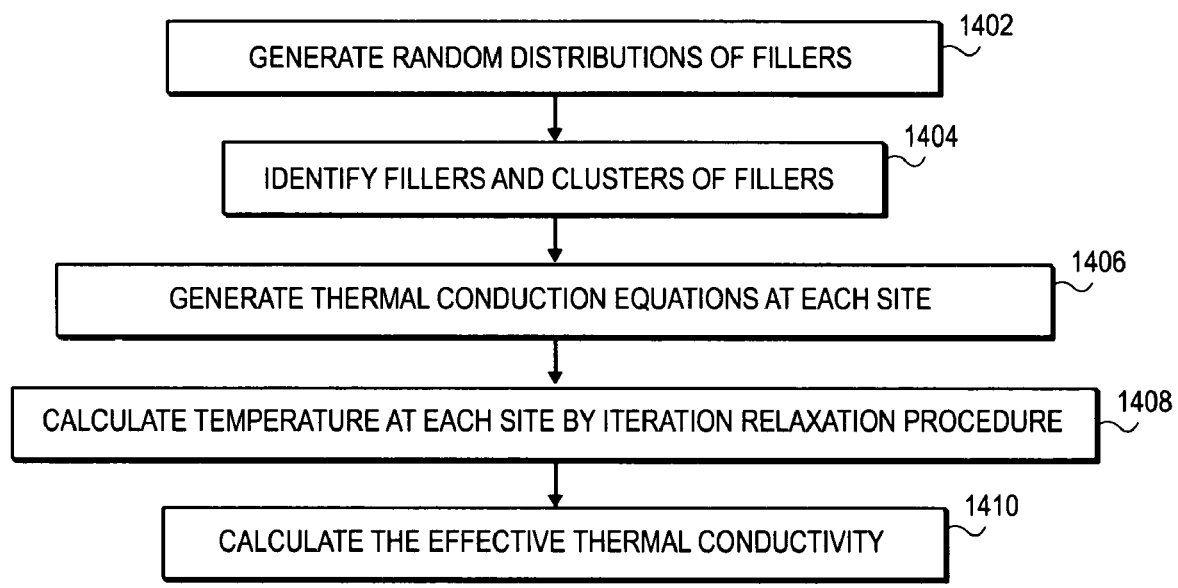
FIG. 14 is a flowchart illustrating a computation process for generating the resistor network depicted in FIG. 11 according to an embodiment of the present invention.

A simplified computation flow chart 1400 of the resistor network model is shown in FIG. 14. In a block 1402, centroid fillers are seeded in a model cube by using pseudo-random variable generator. In a block 1404, fillers and clusters of filler are identified. In a block 1406, thermal conduction equations are established. In a block 1408, according to the thermal conduction equations, the temperature at each site is solved with the known thermal conductance between sites using Kirchhoff's equation and an iterative relaxation procedure. In a block 1410, thermal conductance $G_c$ and thermal conductivity $K_c$ of a composite are calculated using equations (12) and (13), respectively:

$$G_c = \frac{Q_c}{T_{Top} - T_{Bottom}} \tag{12}$$

$$K_c = G_c \frac{L_z}{L_x L_y} \tag{13}$$

where $L_z$ is the thickness of the thermal interface material specimen in the heat flow direction (z-axis), and the product of $L_x$ and $L_y$ is the thermal interface material specimen cross-section area.

In embodiments, the thermal interface material 400 composite comprises three different components; filler, matrix, and solvent. However, the present resistor network model 1100 assumes that a composite is composed of two components. So, in embodiments, the silicon thermal grease and solvent may be homogenized as the matrix.

Figure 15:
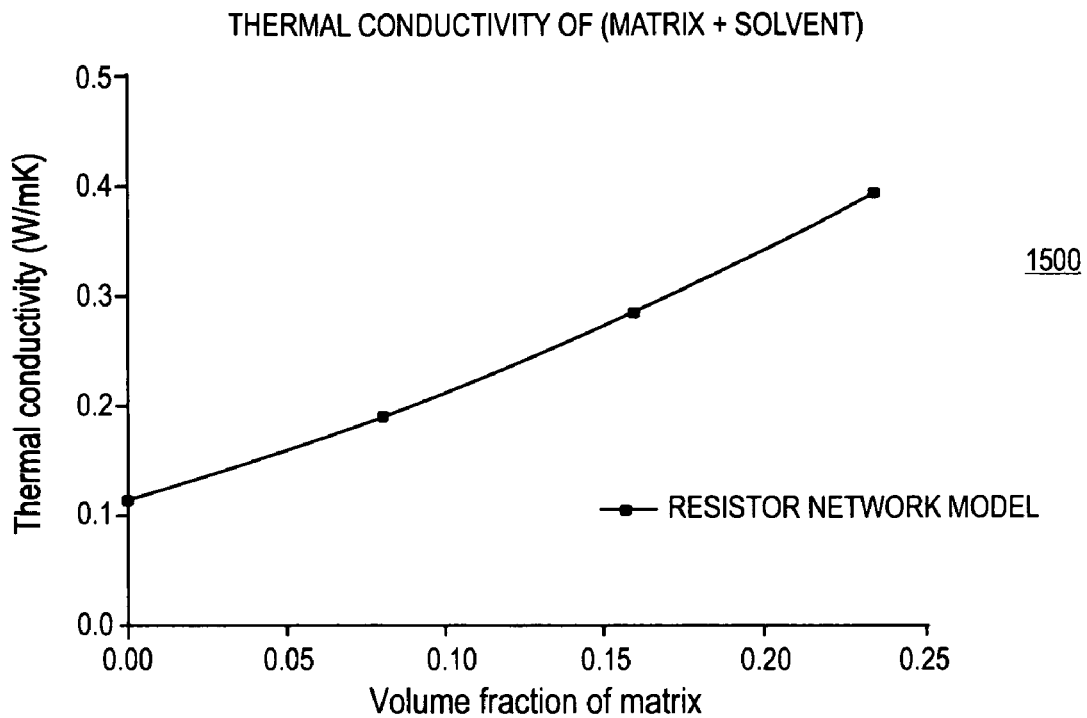
FIG. 15 is a graphical representation illustrating thermal conductivity of the thermal interface material calculated by the resistor network depicted in FIG. 11 according to an embodiment of the present invention.

Thermal conductivity of silicon thermal grease is 1.2 W/mK and that of chloroform is 0.11 W/mK. For both compositions (composition 1 and composition 2), volume fraction of silicon thermal grease is 23.4% while that of chloroform is 76.6%. The total dimension of matrix is 3.0×5.0×5.0 µm, and the dimension of silicon thermal grease is 0.5×0.05×0.05 µm. During the iteration, convergence error criterion of 1.0×10⁻⁵ is used for the successive temperature convergence. FIG. 15 is a graphical representation 1500 illustrating the predicted results of the thermal conductivity of the converted matrix material. When the volume fraction of silicone thermal grease is 23.4%, the thermal conductivity of matrix is estimated by FIG. 15 as 0.3879 W/mK.

Figure 16:
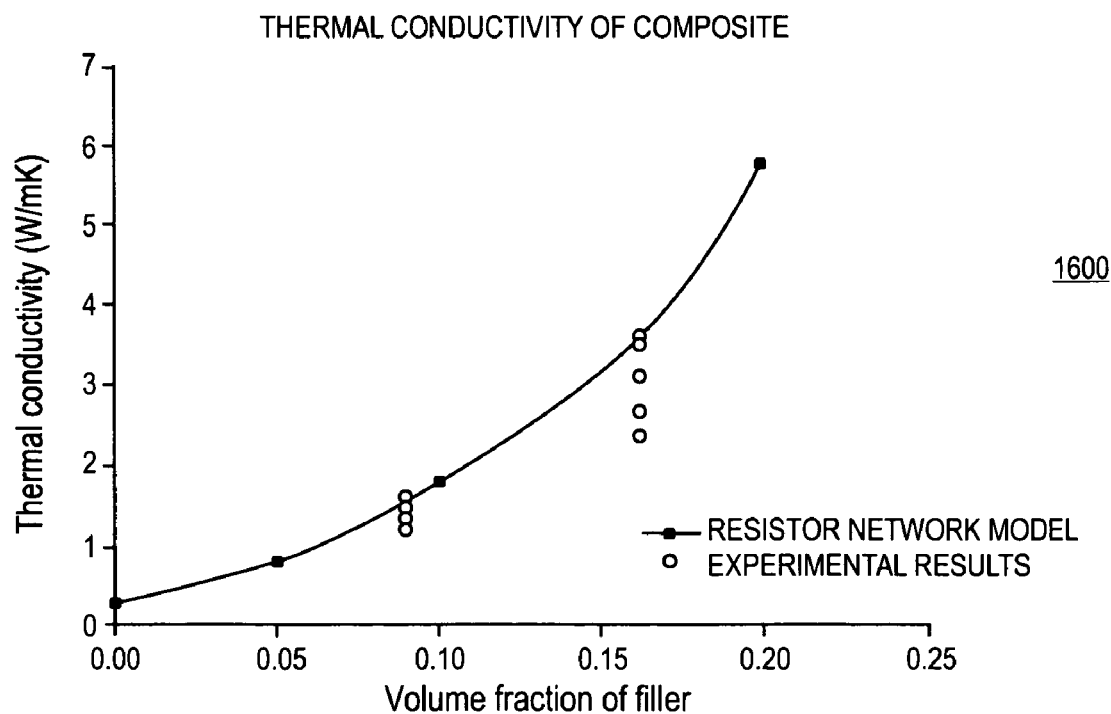
FIG. 16 is a graphical representation illustrating thermal conductivity of the thermal interface material calculated by the resistor network depicted in FIG. 11 according to an alternative embodiment of the present invention.

In embodiments of the present invention, it is assumed that the thermal conductivity of carbon nanotubes is 2000 W/mK, and that of the matrix is 0.3879 W/mK. Volume fractions of carbon nanotubes are 16.2% for composition 1 and 8.9% for composition 2. The total dimensions of the thermal interface material 400 is 3.0×5.0×5.0 µm, and the dimension of each filler is 0.5×0.05×0.05 µm. Each filler is randomly placed into the matrix but only 20% of fillers are oriented to z-axis because the materials are spread into x-y plane during the processing. The thermal conductivity of the thermal interface material 400 composite calculated by 3D resistor network model is shown the graphical representation 1600 in FIG. 16. For the thermal interface material 400 of composition 1 with 16.2% volume fraction of filler, the thermal conductivity of the composite is predicted as 3.572 W/m K.

The experimental data of the thermal impedance of the thermal interface material of composition 1 and composition 2 are converted to thermal conductivity using equation (2) and the results also are shown in the graphical representation 1600, where the composite thickness of 9.5 µm for composite 1 and 9.0 µm for composite 2 are used. The experimental data are close to the predictions by the 3D resistor network model 1100.

Embodiments of the present invention may be implemented using hardware, software, or a combination thereof. In implementations using software, the software may be stored on a machine-accessible medium.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as recess as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method of making a thermal interface material, comprising:
   mixing carbon nanotubes, silicone thermal grease, and chloroform together;
   causing the carbon nanotubes to spread substantially uniformly; and
   evaporating all but a small amount of the chloroform.

2. The method of claim 1, wherein mixing carbon nanotubes, silicone thermal grease, and chloroform together comprises inserting the carbon nanotubes, silicone thermal grease, and chloroform in a beaker.

3. The method of claim 1, wherein mixing carbon nanotubes, silicone thermal grease, and chloroform together comprises mixing carbon nanotubes, silicone thermal grease, and chloroform at room temperature.

4. The method of claim 1, wherein causing the carbon nanotubes to spread substantially uniformly comprises applying ultrasonic power to the carbon nanotubes, silicone thermal grease, and chloroform.

* * * * *